United States Patent [19]

Dartois et al.

[11] Patent Number: 5,327,429
[45] Date of Patent: Jul. 5, 1994

[54] METHOD OF SEQUENCING SIGNAL PROCESSING IN THE REDUCED RATE COMMUNICATION MODE OF A DIGITAL CELLULAR RADIO SYSTEM

[75] Inventors: Luc Dartois, Carrieres Sous Poissy; Emmanuel Rousseau, Paris; Jean-Pierre Guerlin, Le Plessis Bouchard, all of France

[73] Assignee: Alcatel N.V., Amsterdam, Netherlands

[21] Appl. No.: 913,834

[22] Filed: Jul. 15, 1992

[30] Foreign Application Priority Data

Jul. 18, 1991 [FR] France ............................ 91 09089

[51] Int. Cl.⁵ ............................................. H04J 3/12
[52] U.S. Cl. ..................... 370/82; 370/95.1; 370/110.1
[58] Field of Search ............... 370/24, 29, 82, 94.1, 370/95.1, 95.3, 99, 100.1, 105.1, 110.1; 379/59, 60, 63; 455/33.1, 54.1

[56] References Cited

U.S. PATENT DOCUMENTS 5,199,031 3/1993 Dahlin .............................. 370/110.1

OTHER PUBLICATIONS

E. Kuisma et al, "Signal Processing Requirements in Pan-European Digital Mobile Communications", Proc IEEE Int'L Symp on Circuits and Systems, V 2, Jun. 7-9, 1988, Helsinki, pp. 1803-1810.

F. Leyrer, "Mega-Chips Furs Taschentekefon", Funkschau, V 62, N 12, Jun. 1990, Munich, pp. 64-68.

P. Vary, "Implementation Aspects of the Pan--European Digital Mobile Radio System", Proc VLSI and Computer Peripherals, May 8, 1989, Hamburg, pp. 417-422.

J. Natvig et al, "Speech processing in the Pan American Digital Mobile Radio System (GSM)-System Overview", IEEE Global Telecommunications Conf & Exhib V 2, Nov. 27, 1989, Dallas, pp. 1060-1064.

Primary Examiner—Douglas W. Olms
Assistant Examiner—Melvin Marcelo
Attorney, Agent, or Firm—Robbins, Berliner & Carson

[57] ABSTRACT

In a method of sequencing signal processing in the reduced rate communication mode of a digital cellular radio system for conveying digitized speech communications between a terminal and a base station by means of traffic frames each comprising time slots the terminal has a time slot for sending to the base station and a time slot for receiving from the base station. The communication comprises blocks representing groups of speech samples. Each block is formed of sub-blocks each conveyed during traffic frame time slots. During each traffic frame the following are effected: a configuration process, the processing of a receive time slot, the processing of a send time slot, the processing of a send block during a send period outside the traffic frames, and the processing of a receive block during a receive period, a particular traffic frame.

28 Claims, 3 Drawing Sheets

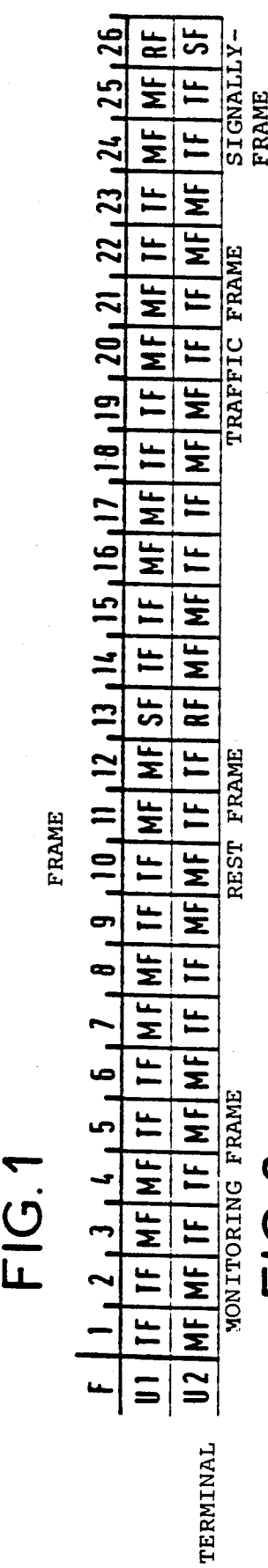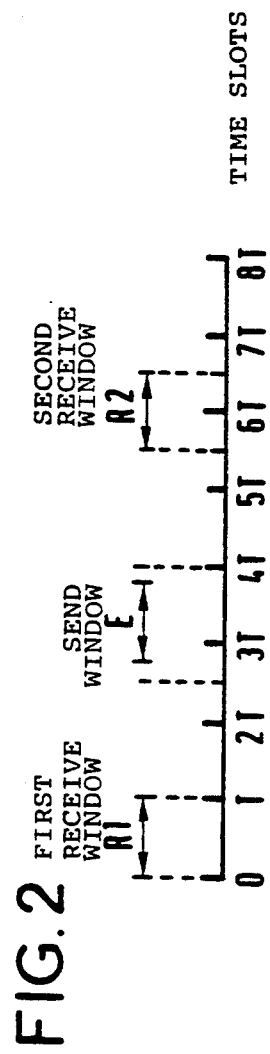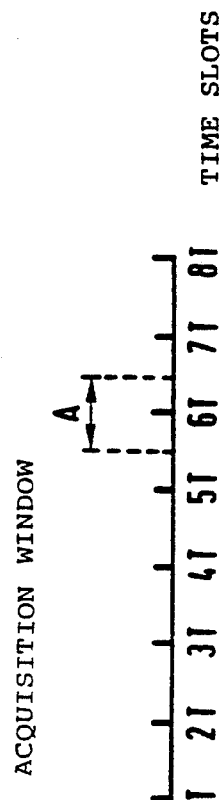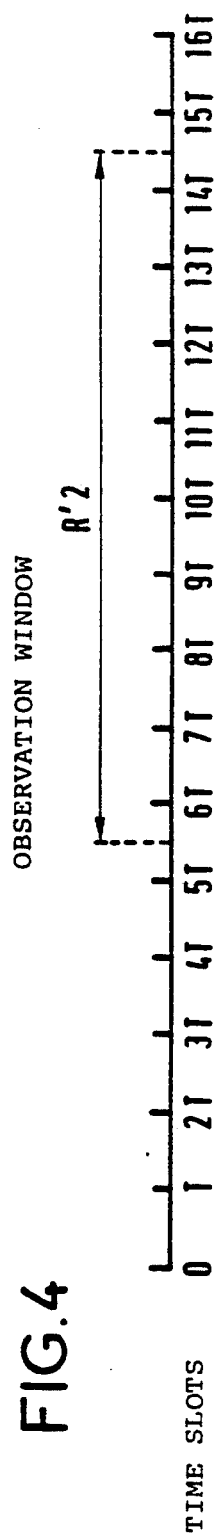

FIG.6

| F | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| TRAFFIC FRAME TF | 1 | 2 | | | | | | | | | | 12 | | | | | | | | | | | | | | |
| SIGNALLING FRAME SF | | | 3 | 4 | | | | | 5 | 6 | | | | 7 | 8 | | | | 9 | 10 | | | 11 | 12 | | |
| REST FRAME RF | | | | | | | | | | | | | O | | | | | | | | | | | | | O |
| PM | 1 | 3 | 2 | 2 | 1 | 3 | 2 | 2 | 1 | 3 | 2 | 2 | 4 | 1 | 3 | 2 | 2 | 1 | 3 | 2 | 2 | 1 | 3 | 2 | 2 | 5/6 |
| OP1 | O | O | O | O | O | O | O | O | O | O | O | O | O | O | O | O | O | O | O | O | O | O | O | O | O | O |
| OP2 | O | O | O | O | O | O | O | O | O | O | O | O | O | O | O | O | O | O | O | O | O | O | O | O | O | O |
| OP3 | O | O | O | O | O | O | O | O | | | | | O | | | | | | | | | O | O | O | | |
| OP4 | | | | | | | | | | | | | | | | | | | | | | | | | | |
| OP5 | | | | | | | | | | | | | | | | | | | | | | | | | | |
| OP6 | O | O | | | O | O | | | O | | | | O | O | O | | | O | O | | | | O | | | |
| OP7 | | O | | | | O | | | | O | | | O | | O | | | | O | | | O | O | | | O |
| OP8 | | O | | | | O | | | | O | | | | | O | | | | O | | | | O | | | |
| OP9 | O | O | O | O | O | O | O | O | O | O | O | O | O | O | O | O | O | O | O | O | O | O | O | O | O | O |
| OP10 | O | O | O | O | O | O | O | O | O | O | O | O | | O | O | O | O | O | O | O | O | O | O | O | O | O |
| OP11 | | | | | | | | | | | O | O | | | | | | | | | | | | | O | |
| OP12 | | | | | | | | O | O | | O | O | | | | | O | | | | O | | | | O | |
| OP13 | O | O | O | | O | O | O | | | O | | | O | | O | | | | O | | | O | O | | | |
| OP14 | O | O | O | | O | O | O | O | O | O | O | O | O | | O | O | | O | O | O | O | O | O | O | | |
| OP15 | O | O | O | O | O | O | O | O | O | O | O | O | O | O | O | O | O | O | O | O | O | O | O | O | O | O |

METHOD OF SEQUENCING SIGNAL PROCESSING IN THE REDUCED RATE COMMUNICATION MODE OF A DIGITAL CELLULAR RADIO SYSTEM

BACKGROUND OF THE INVENTION

1. Field of the invention

The present invention concerns a method of sequencing digital signal processing in the reduced rate communication mode of a digital cellular radio system using time-division multiple access, for example the panEuropean cellular radiotelephone system.

2. Description of the prior art

The digital signal processing will now be explained with reference to a terminal in order to clarify the disclosure, although this must not be seen as limiting the invention in any way. The terminal exchanges information by means of radio signals with a base station which is an access point to the cable communication network. It therefore comprises a radio circuit which converts the receive radio signal into a baseband digital signal and carries out the converse operation to produce the send signal. It also comprises a signal processing circuit which carries out various operations on the baseband receive signal to produce a digital speech signal to be routed to a converter circuit and which carries out the converse operations on the send signal. The converter circuit carries out the digital-to-analog and analog-to-digital conversions constituting the interface between the microphone and the loudspeaker of the terminal, on the one hand, and the signal processing circuit, on the other hand. The terminal also comprises a control circuit which directs the operation of the terminal, including the radio circuit and the signal processing circuit. Hereinafter the expression digital signal processing is to be understood as referring to all of the operations carried out by the signal processing circuit.

The expression communication mode is to be understood as meaning the operating mode after call set-up is completed, whether communication is at the full rate or at a reduced rate (these concepts will be explained later).

In other words, the following explanation presupposes that the call set-up procedures have been accomplished already (they do not form any part of the present invention).

The radiotelephone systems of interest are so-called time-division multiple access systems. These use repetitive frames subdivided into time slots. Full rate communication between a base station and a terminal takes place over a communication channel comprising two separate time slots in each frame, one for each transmission direction, these time slots always occupying the same position within the frame.

One specific system using this method is the panEuropean digital cellular radiotelephone system defined by the Groupe Spécial Mobile (GSM) of the European Telecommunications Standards Institute (ETSI).

A reduced rate communication mode is provided in which a plurality of terminals (two terminals, for example) share the same communication channel. The two terminals use the same time slots to send and receive but in different frames. One possible solution is to assign the first and second frames to the first terminal, the third and fourth frames to the second terminal, the fifth and sixth frames to the first terminal, and so on.

The invention will be explained with reference to this particular system, so that it is possible to refer to a known infrastructure, in particular the recommendations published by the GSM.

It follows that:
- the baseband digital signal is a digital signal modulated by Gaussian Minimum Shift Keying (GMSK) at 270.3 Kbit/s,
- the speech digital signal comprises samples each of 13 bits at 8 kHz,
- communications with the control circuit essentially concern process commands, signalling and synchronization information.

The GSM system uses two overlaid time structures, namely multiframes comprising either 26 frames or 51 frames and called by convention 26 multiframes and 51 multiframes, respectively. The 51 multiframe is used in the call set-up procedure. The 26 multiframe is used to route the calls.

In communication mode the terminal therefore uses the 26 multiframe, call set-up and the change from the 51 multiframe to the 26 multiframe being explained in GSM recommendations of series 04 and 05. The various functions to be implemented in this mode can be divided into send functions and receive functions:

— send functions:
+ send speech processing: production by encoding of a speech block of approximately 130 bits from 160 speech samples each of 13 bits, which represents a half rate call to use the GSM terminology (the processing for the full rate is specified GSM recommendations 06.10, 06.12, 06.31 and 06.32).

+ channel coding: production of a coded block of 228 bits from a speech block (the coding for the full rate is specified in GSM recommendation 05.03).

+ interleaving: formation of an interleaved block of 232 bits from sub-blocks of two coded blocks (full rate interleaving is specified in GSM recommendation 05.03).

+ encipherment: producing packets of 116 bits from the interleaved blocks, each packet comprising two sub-blocks (GSM recommendation 03.20).

+ packet processing: production of a burst in the time slot format by adding control bits to a packet (GSM recommendations 05.01 and 05.02).

+ GMSK modulation: digital modulation of the bits forming the bursts (GSM recommendation 05.04).

— receive functions:
+ GMSK demodulation: this function is the counterpart of GMSK modulation and recovers the packets.
+ decipherment.
+ de-interleaving.
+ channel decoding.
+ receive speech processing: recovery of 160 samples each of 13 bits at 8 kHz from a speech block of approximately 130 bits.

The solution usually adopted is to execute these various functions in parallel in a so-called multitasking sequence which means using dedicated units for each function or group of functions, these units being able to operate simultaneously. The functions are clearly delimited and appear as such in the GSM recommendations. This solution is further justified by the complexity of the functions which leads naturally to considering them individually and also considering separately the means of generating them.

However, multitasking is characterized by the following features. Firstly, it imposes a complex structure of interrupt management at the level of the control circuit in order to coordinate the implementation of the various functions in the various units. Secondly, it requires the use of large buffers to store intermediate results generated by the various functions. Thirdly, it increase the complexity of synchronization of signal processing relative to that of the GSM system. One immediate consequence of these characteristics is the need to provide dedicated modules to meet the requirements of multitasking, which increases the surface area of silicon used. This is not desirable with regard to the cost or size of the circuit, factors of particular importance in the case of portable terminals.

Accordingly, one object of the invention is a method of sequencing digital signal processing which is of the single-tasking or serial type.

SUMMARY OF THE INVENTION

The invention consists in a method of sequencing signal processing in the reduced rate communication mode of a digital cellular radio system for conveying digitized speech communications between a terminal and a base station by means of a communication channel, said system using multiframes comprising frames comprising time slots, said communication taking place in some at least of said frames referred to as traffic frames, said terminal having a time slot for sending to said base station and a time slot for receiving from said base station, said communication comprising coded blocks representing groups of speech samples, each coded block being formed of 2·s sub-blocks each conveyed during one traffic frame, the pth sub-block of a coded block and the (p+s)th sub-block of the preceding coded block being combined in a pth packet which takes place in a time slot, said multiframes comprising a number of traffic frames which is a multiple of the number of sub-blocks 2·s, the first traffic frame of one of said multiframes being used to send the first sub-block of the nth coded block, any traffic frame of said multiframe being identified by the expression s·j+p where p varies from 1 through s and j is a positive or null integer, in which method the multiframe comprising groups of consecutive frames each including the traffic frames needed to convey a coded block, a group of frames being therefore identified by its position in the multiframe which presents the value of j, during the jth group of frames:

— during each traffic frame the following operations are effected:

+ a configuration process,

+ the processing of a receive time slot to recover the pth sub-block of the (j+n)th coded block and the (p+s)th sub-block of the (j+n−1)th coded block from the pth receive packet, + the processing of a send time slot to group the pth sub-block of the (j+n)th coded block and the (p+s)th sub-block of the (j+n−1)th coded block and form the pth send packet, — during a send period preceding the (j+1)th group of frames, processing a send block by forming the (j+n+1)th coded block to be sent from a group of speech samples to send, — during a receive period also preceding the (j+1)th group of frames, processing a receive block to recover the (j+n−2)th coded block received and recover the group of speech samples received corresponding to it.

It is seen that each group of information is processed immediately it is available, which avoids intermediate stages.

According to one subsidiary feature of the invention, the send and receive periods are separate for the same value of j.

The workload is therefore distributed in time to minimize the computing power required.

Moreover, the send periods of each group of frames preferably occupy the same position in the groups.

Likewise, the receive periods of each group of frames preferably occupy the same position in the groups.

The sequencing accordingly has a periodic structure, which simplifies it.

Moreover, the system being designed so that the base stations broadcast signals over control channels, during at least one traffic frame additional processing is preferably carried out to measure the power of the signal received on one of the control channels.

The "dead times" of a frame are therefore used to prepare for possible transfer of the call from one base station to another base station.

The send period preferably occurs in a group of frames outside the traffic frames of that group.

This arrangement makes it possible to improve further the distribution of the workload in time.

The receive period advantageously coincides with a traffic frame, for example that conveying the last sub-block of the (j+n−1)th coded block.

The processing operations mentioned previously are preferably carried out sequentially, so re-inforcing the singletasking nature of the sequencing.

According to another subsidiary feature of the invention, the configuration process comprises only two operations:

— a first operation, carried out first in a frame to specify the other processing operations to be carried out during that frame, — a last operation carried out after the other processing operations so as to be able to use the results that they produce, so indicating the end of the processing operations in the frame.

According to another subsidiary feature of the invention, the processing of a send time interval includes enciphering the pth send packet, forming a burst from said packet and modulating said burst, the digitized speech communications being made up of such bursts.

According to another subsidiary feature of the invention, the processing of a receive time slot comprises the following operations:

— preliminary processing of a receive burst,

— demodulation of said burst to define the pth receive packet which is then deciphered by a process which is the converse of the encipherment applied to the send packet.

According to another subsidiary feature of the invention, the processing of a send block comprises the following operations:

— speech coding of the group of speech samples to send to form a speech send block, — channel coding of this send speech block to define the coded block to send.

According to another subsidiary feature of the invention, the processing of a receive block comprises the following operations:

— channel decoding of the received coded block by a process which is the converse of the channel coding to recover a received speech block, — speech decoding of the received speech block by a process which is the converse of the speech coding to recover the received group of speech samples.

The various operations may be carried out sequentially. The single-tasking character of the sequencing is thereby re-inforced, which makes it possible to divide the workload in time in order to equalize the computing power required as a function of time.

In one embodiment of the invention, the multiframes each further comprise at least one signalling frame used to send signalling information by means of coded signalling blocks between said terminal and said base station, each coded signalling block is conveyed by packets during t successive signalling frames, each coded signalling block is formed of 2·t sub-blocks grouped in pairs in said packets, any signalling frame is identified by the expression $MT = t \cdot (i-1) + q$ where q varies from 1 through t and i is a positive integer representing the number of a coded signalling block, and:

— during each signalling frame the following operations are effected:

+ a configuration procedure which among other things gives the value of q,

+ a receive procedure for recovering the two sub-blocks of the qth packet of the ith received coded signalling block, + a send procedure to group the two sub-blocks of the qth packet of the ith send coded signalling block, — during a particular decoding signalling frame, for each value of i, there is effected after reception of the last packet of a receive coded signalling block a decoding procedure to recover the respective receive signalling information, — during a particular coding signalling frame, for each value of i, there is effected before sending of the first packet of a signalling block a procedure for coding the respective send signalling information.

In this way the processing of a signalling channel uses the same procedure as that adopted previously.

For the same value i, the decoding frame and coding frame are preferably two separate frames, for which there are two separate values of q.

The decoding frames for the various values of i are preferably identified by the same value of q.

The coding frames for different values of i are preferably identified by the same value of q.

In a preferred embodiment of the invention the procedure for decoding the ith coded signalling block takes place during the (t·i)th signalling frame after the receive procedure.

Similarly, the coding procedure relating to the ith coded signalling block preferably takes place during the $[t(i-1)+1]$th signalling frame before the send procedure.

The system being designed so that the base stations broadcast signals on control channels, during at least one of the signalling frames additional processing is preferably carried out to measure the power of the received signal on one of the control channels.

The various procedures may be implemented sequentially, procuring the advantages already explained.

The multiframes additionally comprising an idle frame, an observation window required for receiving a frequency control channel supporting a signal of predetermined frequency and taking place between the end of said processes or said procedures effected during the frame preceding said idle frame and the end of said idle frame, an analysis range extending therefore from the start of said observation window to the end of said idle frame, during one of said analysis stages at least there is preferably effected a frequency control process comprising the following operations:

— an initialization operation,

— a frequency control operation to establish if said predetermined frequency has been detected during said observation window, and — a terminal operation indicating the end of said frequency control process and the result of the preceding detection comprising, if positive, a detection message.

As previously, the processing of a frequency control channel is optimally a single-tasking sequence and therefore procures the advantages already mentioned.

When the predetermined frequency has been detected, a synchronization channel associated with the frequency control channel supporting a synchronization packet located in one of the observation windows at the place indicated in the detection message, the synchronization packet comprising a synchronization message which has been coded, during the analysis phase corresponding to said observation window a synchronization process is preferably carried out comprising the following operations:

— preliminary operation specifying in particular the temporal position of the synchronization packet, — synchronization operation to recover the synchronization message from the synchronization packet, and — final operation indicating the end of synchronization processing and supplying the synchronization message.

The previous remark concerning the processing of a frequency control channel applies equally to a synchronization channel.

The frequency control processing associated with an idle frame is preferably grouped with the processes or procedures carried out during the frame preceding the idle frame, the set of these processes and/or procedures spreading over the two frames concerned, the initialization operation and the terminal operation being then incorporated into the configuration processing or into the configuration procedure.

By analogy, the synchronization processing associated with a rest frame is preferably grouped with the processes or the procedures carried out during the frame preceding the rest frame, the set of these processes and/or procedures spreading over the two frames concerned, the preliminary operation and the final operation being then incorporated into the configuration processing or into the configuration procedure.

The sequencing therefore tracks the timing of the frames.

The invention will now be described by way of non-limiting example with reference to the appended drawings.

BRIEF DESCRIPTION OF THE DRAWINGS

FIG. 1 shows the distribution of frames between two terminals.

FIG. 2 shows the structure of a traffic frame.

FIG. 3 shows the structure of a monitoring frame.

FIG. 4 shows the structure of an idle frame and the frame preceding it.

FIG. 6 is a table describing sequencing in accordance with the invention, specifying the operations which are effected for a given frame.

DETAILED DESCRIPTION OF THE INVENTION

Figure 5:
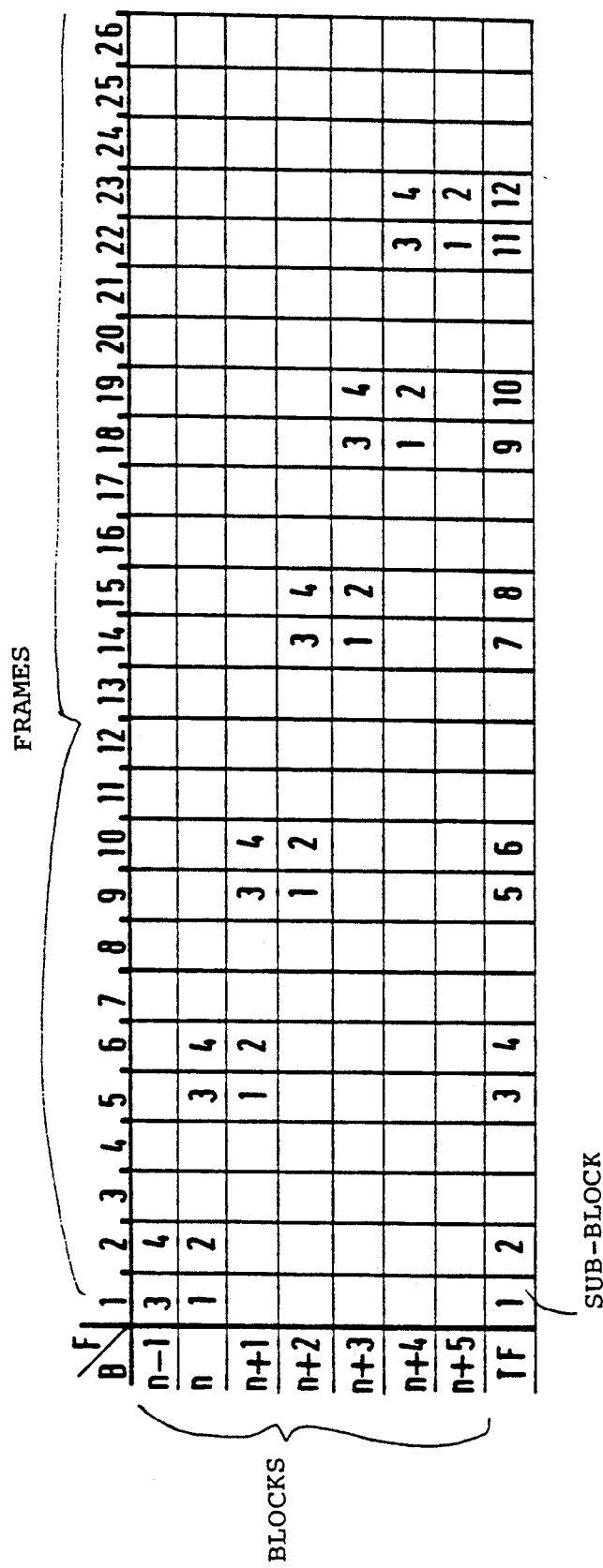
FIG. 5 shows the organization of decoded blocks and the sub-blocks constituting them during a multiframe.

By way of introduction, it should be borne in mind that in the GSM system the terminal and the base station communicate over radio channels which are either traffic channels TCH used to convey speech or data or control channels used to set up and maintain calls. It will be assumed hereinafter that the TCH channel is a "half rate" speech channel in the GSM sense representing a rate of approximately 6.5 kbit/s after speech coding.

Demodulation is preceded by processing of a received burst to correct the dc component introduced by the radio circuit and to carry out frequency conversion appropriate to the GMSK modulation employed.

The communication mode is broken down into mode phases. The breakdown given by way of example represents exchanges of information between the control circuit and the signal processing circuit: each mode phase is triggered in the signal processing circuit by the control circuit. It follows that the description will be essentially concerned with sequencing the operation of the signal processing circuit.

Each mode phase is broken down into operations, it being understood that some operations are common to more than one mode phase. These operations, listed below, are identified by a number:

Operation OP1: acquisition and interpretation of a message from the control circuit supplying the data required and the configuration parameters;

Operation OP2: preprocessing of a received burst;

Operation OP3: received baseband signal power measurement;

Operation OP4: processing of a received frequency control channel FCCH by estimating the signal frequency sent on this channel to achieve coarse frequency synchronization between the terminal and the base station (GSM recommendation 05.01);

Operation OP5: processing of a received synchronization channel SCH to refine the frequency synchronization to synchronize the terminal and the base station (GSM recommendation 05.01);

Operation OP6: basic processing of a received packet to demodulate a burst to which operation OP2 has been applied, recover a packet from the demodulated burst and decipher the packet to recover the two sub-blocks constituting it;

Operation OP7: channel decoding of a coded block;

Operation OP8: receive speech processing;

Operation OP9: temporary storage of speech samples as they are received to combine them into groups of 160 before send speech processing (OP11);

Operation OP10: temporary storage of groups of 160 speech samples to restore them one by one following receive speech processing (OP8);

Operation OP11: send speech processing;

Operation OP12: channel coding of a block;

Operation OP13: basic processing of a send packet to combine two sub-blocks and to encipher the result to obtain a packet;

Operation OP14: additional processing of a send packet to form a burst from a packet and to modulate the burst;

Operation OP15: sending of a message to the control circuit supplying the various results it requires and/or the status of the signal processing circuit.

The various mode phases are identified by a number and assigned the various operations which they include:

0) Initialization: operations OP1 and OP15.

1) Basic frame processing: operations OP1, OP2, OP3, OP6, OP9, OP10, OP13, OP14, OP15.

2) Monitoring processing and coding: operations OP1, OP3, OP9, OP10, OP11, OP12, OP15.

3) Frame processing and decoding: operations OP1, OP2, OP3, OP6, OP7, OP8, OP9, OP10, OP13, OP14, OP15.

4) Signalling frame processing: operations OP1, OP2, OP3, OP6, OP7, OP9, OP10, OP12, OP15.

5) Frequency control processing: operations OP1, OP2, OP3, OP4, OP9, OP10, OP11, OP12, OP15.

6) Synchronization processing: operations OP1, OP2, OP3, OP5, OP9, OP10, OP11, OP12, OP15.

The division of the frames F of the 26 multiframe between two terminals U1, U2 will now be described with reference to FIG. 1.

The first terminal U1 is assigned traffic frames (TF) 1, 2, 5, 6, 9, 10, 14, 15, 18, 19, 22, 23.

The second terminal U2 is assigned traffic frames (TF) 3, 4, 7, 8, 11, 12, 16, 17, 20, 21, 24, 25, which as far as the first terminal is concerned are monitoring frames (MF).

Frame 13 is used for the Slow Associated Control Channel (SACCH) for the first terminal U1 and is called the signalling frame (SF). Frame 26 is not currently used and is called the "idle" frame; it will therefore be a "rest" frame (RF) for the first terminal U1. The roles of frames 13 and 26 are interchanged between the two terminals, that is to say that they will respectively be the rest frame RF and the signal frame SF for the second terminal. This is, of course, just one example of frame distribution and should not been seen as limiting on the invention.

Moreover, since it follows from what has been said above that both terminals have the same resources in terms of frames, it is only the first terminal that will be considered hereinafter, to clarify the description, and it will be referred to as "the terminal".

It must be born in mind that GSM time slots have a duration T and that a frame therefore has a duration 8 T.

Referring to FIG. 2, in a traffic frame TF the terminal has a first receive window R1 corresponding to a receive time slot which is assigned to it by the base station, the start of this window being by convention the time origin. The send window E corresponding to the send time slot of this terminal is at a position determined by the base station between 2.5 T and 4 T, which is a GSM constraint. There are no GSM recommendations in respect of the period between times 4 T (end of send window E) and 8 T (start of next frame). This period is therefore available for various processing operations which must not be considered as obligatory and thereby as limiting on the invention.

In these traffic frames there is a second receive window R2 between 5.5 T and 6.5 T. The purpose of the second receive window will be explained later during the detailed description of sequencing.

Referring to FIG. 3, in the monitoring frames MF except for frame 25 an acquisition window A is defined between 5.5 T and 6.5 T homologous to the second receive window R2. The purpose of the acquisition window A will be explained later.

In frames 25 and 26 the arrangement is again different, as shown in FIG. 4. Unlike the previous case, another receive window R'2 is defined of duration 9 T, overlapping the 25th and 26th frames, beginning at 5.5 T and taking as its time origin the start of the 25th frame. The purpose of the receive window R'2 (which will be called the observation window to avoid any possibility of confusion) will be explained later during the detailed description of sequencing.

It will be beneficial here to outline the structure of the TCH channel as defined by GSM.

A speech block directed to the radio circuit is subjected to channel coding which produces a coded block B in the form of four sub-blocks SB. The coded blocks are then interleaved to form an interleaved block comprising the first two sub-blocks of a coded block and the last two sub-blocks of the preceding coded block. Enciphering an interleaved block defines two packets each of which will be sent during one send window i.e. in the same time slot of two successive frames.

These packets are therefore made up as follows:
— first packet: first sub-block of a coded block and third sub-block of the preceding coded block,
— second packet: second sub-block of the coded block and fourth sub-block of the preceding coded block.

It is therefore apparent that a coded block B requires four frames to send it, one for each sub-block.

The table in the fifth figure will be explained with reference to the 26 multiframe in which the first frame conveys the first sub-block of the nth coded block. In this table the columns represent the frames F and the rows represent the coded blocks B. The boxes give the numbers of the sub-blocks SB belonging to the coded blocks of the respective row and sent during the frame of the respective column. Thus the two sub-blocks of the same packet appear in the same column.

The multiframe can therefore convey six coded blocks, the first two sub-blocks of the $(n-1)$th coded block being sent during the previous multiframe and the last two sub-blocks of the $(n+5)$th coded block being sent in the next multiframe.

The traffic frames can be numbered according to the order in which they appear in the multiframe, that is to say that the traffic frames TF=1, 2, 3, 4, 5, 6, 7, 8, 9, 10, 11, 12 are in corresponding relationship to the respective frames F=1, 2, 5, 6, 9, 10, 14, 15, 18, 19, 22, 23.

It is possible to generalize the previous table by indicating that the ith sub-block of the kth coded block is sent in the traffic frame $TF=i+2(k-n)$.

The blocks considered until now are the blocks intended to be passed to the radio circuit i.e. the send blocks. The situation is exactly the same in respect of the receive blocks (i.e. the blocks from the radio circuit), to the degree that the table in FIG. 5 and the previous notation is equally valid.

A timing constraint is imposed by the GSM in respect of the interface between the signal processing circuit and the converter circuit. The groups of speech samples represent 20 ms of speech, i.e. a duration of 60 ms for three groups, which represents the duration of 13 frames. Also, the sending of a block extends over six frames (blocks n, n+1, n+3 and n+4) or seven frames (blocks n+2 and n+5) and consequently is of variable duration. The signal processing circuit therefore includes a regularization unit provided with a buffer memory, for example, which receives the speech samples from the converter circuit continuously and combines them into groups of 160 at the appropriate time so as to compensate for this variation in the sending time (this is operation OP9). Similarly, the recovery of the groups of 160 samples at the regularization unit does not have the required period of 20 ms either. The latter also delivers the speech samples continuously from these restored groups in a non-periodic manner (this is operation OP10). Because the implementation of this unit will be obvious to the man skilled in the art it will not be described in any further detail.

In the remainder of the description it will therefore be assumed that the operations OP9 and OP10 are carried out in the regularization unit. What is more, in this case these operations can be carried out in real time "on the fly". This solution is adopted for this example. The speech samples from the converter circuit are therefore subjected to operation OP9 as they are acquired and before they are stored to form the groups of 160 samples. Similarly the groups of 160 samples obtained by processing the received speech signal are stored before they are subject to operation OP10 to deliver the speech samples one by one to the converter circuit at 8 kHz. Consequently these two operations are carried out continuously, independently of any sequencing constraints.

The background needed to understand the invention having now been outlined, the signal processing sequence will now be described with reference to FIG. 6.

As previously explained, the 26 multiframe comprises 12 traffic frames TF representing six interleaved blocks each comprising two packets each formed by two sub-blocks. The traffic frames can therefore be identified using the expression:

$$TF = 2j + p$$

in which j represents an interleaved block and varies from 0 to 5 and p represents a packet and takes the value 1 or 2.

Consider again the 26 multiframe in which the first sub-block of frame 1 is that of the nth coded block. The nth interleaved block comprises the first two sub-blocks of the nth coded block and the last two sub-blocks of the $(n-1)$th coded block.

The sequencing will now be explained with reference to the value of p, given that mode phase 0 (initialization of the signal processing circuit) represents no particular difficulty. It is effected once only on entering communication mode and is therefore not critical, particularly from the timing point of view. The other mode phases are triggered by the control circuit at the start of a frame.

p=1: mode phase 1, PM=1
— operation OP1: the control circuit sets the signal processing circuit in this mode phase, supplying it the necessary information.
— operation OP2: preprocessing of the burst received in the first receive window R1.
— operation OP6: demodulation of this burst, recovery of the corresponding packet to recover the first sub-block of the $(j+n)$th coded block and the second sub-block of the $(j+n-1)$th coded block.
— operation OP9: temporary storage of received speech samples.
— operation OP10: temporary storage of groups of speech samples.

— operation OP13: grouping of the first sub-block of the (j+n)th coded block to send and the third sub-block of the (j+n−1)th coded block to send and encipherment to form a packet.

— operation 14: formation of a burst from the preceding packet and modulation of this burst.

— operation 15: transmission to the control circuit of a message supplying the various results it requires and/or the status of the signal processing circuit.

As already mentioned, an additional operation may be provided which takes place before operation OP15. This is operation OP3 which measures the power of the baseband digital signal received on a channel other than the traffic channel TCH during the second receive window R2.

This signal is sent by an adjacent base station on the broadcast channel BCCH.

In the case of a mobile terminal, this makes it possible to prepare for transfer of the call from a first base station to a nearer second base station, known as the "handover" process.

p=2, mode phase 3, PM=3

— operation OP1: the control circuit sets the signal processing circuit in this mode phase, supplying it the necessary information.

— operation OP2: preprocessing of the burst received in the first receive window R1.

— operation OP6: demodulation of this burst, recovery of the corresponding packet to recover the second sub-block of the (j+n)th block and the fourth sub-block of the (j+n−1)th coded block.

— operation OP7: channel decoding of the (j+n−2)th coded block from the four sub-blocks constituting it.

— operation OP8: speech processing on receiving the (j+n−2)th speech block and recovery of this block to the regularization unit.

— operation OP9: temporary storage of received speech samples.

— operation OP10: temporary storage of groups of speech samples.

— operation OP13: grouping of the second sub-block of the (j+n)th coded block to send and the fourth sub-block of the (j+n−1)th coded block to send and encipherment to form a packet.

— operation OP14: formation of a burst from the preceding packet and modulation of this burst.

— operation OP15: transmission to the control circuit of a message supplying the various results it requires and/or the status of the signal processing circuit.

As in mode phase 3, provision may be made for carrying out operation OP3 before operation OP15.

In the two monitoring frames which follow the traffic frames referred to above the following phase mode is activated:

phase mode 2, PM=2

— operation OP1: the control circuit sets the signal processing circuit in this mode phase, supplying it the necessary information.

— operation OP9: temporary storage of received speech samples.

— operation OP10: temporary storage of groups of speech samples.

— operation OP11: speech processing on sending the (j+n+1)th speech block.

— operation OP12: channel coding of this speech block to form the (j+n+1)th coded block to send.

— operation OP15: sending to the control circuit of a message supplying the various results it requires and/or the status of the signal processing circuit.

As in mode phase 3, provision may be made for effecting operation OP2 in relation to the acquisition window A and then effecting operation OP3 before operation OP15.

It is therefore clear that many operations are common to mode phases 1, 2, 3.

These operations may be grouped into processes as follows:

— configuration process: operations OP1 and OP15.
— receive time slot process: operations OP2, OP6 using the generic notation formulated in mode phase 1.
— send time slot process: operations OP13, OP14 using the same notation.
— power measurement process: operation OP3, which is optional, as already explained.

The operations specific to mode phases 2 and 3 can also be grouped as follows:

— send block process: operations OP11 and OP12; this processing is carried out during two monitoring frames and usually takes place during a send period for which the only requirement specified is that it precedes sending of the preceding coded block.
— receive block process: operations OP7 and OP8; this processing is carried out during a traffic frame and usually takes place during a receive period for which the only requirement specified is that it follows reception of the preceding coded block.

Given these details, it is possible to define a group of consecutive frames as the set of frames during which all processing relating to the coded block is carried out. In the present case the various groups comprise, for example, frames 1 through 4, 5 through 8, 9 through 12, 14 through 17, 18 through 21 and 22 through 25.

The example adopted can thus be readily generalized to the case of a system designed as follows:

— each coded block is formed from 2·s sub-blocks where s is an integer,
— each interleaved block is formed of s packets, the pth packet comprising the pth sub-block of a coded block and the (p+s)th sub-block of the preceding coding block, and
— the multiframe comprises a number of traffic frames which is a multiple of the number of sub-blocks (2·s).

Except for operations OP9 and OP10, which in this example are effected in real time, the sequencing defined in this way lends itself well to single-tasking type implementation. The various processing operations are carried out sequentially, given that configuration processing will be conceptually divided into two processes corresponding to operations OP1 and OP15 respectively occupying the first and last places. Moreover, the various operations provided in a particular process will also be carried out sequentially, once again with the exception of operations OP9 and OP10.

The various communication processes having been described, the complementary sequencing processes in accordance with the invention will now be discussed.

It has previously been explained that the 26 multiframe comprises traffic frames TF and monitoring frames MF. It also comprises other frames including signalling frames SF for conveying signalling information in blocks. In the GSM system this applies to frame 13, for example, which is used as the slow associated control channel SACCH.

The SACCH structure as defined by the GSM differs slightly from the TCH structure. A signalling block intended for the radio circuit and conveyed by the SACCH is also subject to channel coding but this produces a coded block formed of eight sub-blocks. However, the coded blocks are then interleaved differently to form an interleaved block which will lead to the formation of packets made up as follows:

— first packet: first and fifth sub-blocks of a coded block,

— second packet: second and sixth sub-blocks of this coded block,

— third packet: third and seventh sub-blocks of this coded block,

— fourth packet: fourth and eighth sub-blocks of this coded block.

It is thus clear that a coded block requires four frames, and therefore also four multiframes, to send it, one for each packet. By convention in the 26 multiframe (MT) the qth packet of the ith coded block is sent:

$$MT = 4(i-1) + q$$

Blocks intended for the radio circuit (send blocks) have been considered until now. The situation is exactly the same with respect to the receive blocks (blocks from the radio circuit).

The sequencing of the thirteenth frame (which uses the fourth mode phase, PM=4) will now be discussed in relation to the multiframe MT number and more precisely in relation to the value of q.

— operation OP1: the control circuit sets the signal processing circuit in this mode phase, telling it also the value of q.

— operation OP2: preprocessing of the received burst.

— operation OP6: demodulation of this burst, recovery of the corresponding packet to recover the qth and the (q+4)th sub-blocks of the ith coded block received.

— operation OP7: effected if q=4, channel decoding of the ith coded block received from the eight sub-blocks constituting it.

— operation OP9: temporary storage of received speech samples.

— operation OP10: temporary storage of groups of speech samples.

— operation OP12: effected if q=1, channel coding to form the ith coded block to send.

— operation OP13: formation of the qth packet to send with the qth and (q+4)th sub-blocks of the ith coded block to send.

— operation OP14: formation of a burst from the preceding packet and sending of this burst.

— operation OP15: sending to the control circuit of a message giving the various results it requires and/or the status of the signal processing circuit.

As in mode phases 1, 2 and 3 provision may also be made for effecting operation OP3 before operation OP15.

The various operations can be grouped into procedures as follows:

— configuration procedure: operations OP1 and OP15,

— receive procedure: operations OP2 and OP6,

— send procedure: operations OP13 and OP14,

— block decoding procedure: operation OP7,

— block coding procedure: operation OP12,

— where applicable, additional procedure: operation OP3.

It follows that the example adopted may be easily generalized to a system designed as follows:

— each coded signalling block is formed of 2·t sub-blocks where t is an integer, — a packet comprises two sub-blocks of the same coded block, the sending of this block therefore requiring t packets, — the multiframe comprises one or more signalling frames SF (the thirteenth in the example) for conveying these signalling blocks, the notation MT usually representing the signalling frame number, — the procedure for decoding a block takes place after the last packet of the block is received, and — the procedure for coding a block takes place before sending the first packet of the block.

The previous remark concerning the sequential nature of the various processes carried out during traffic frames naturally applies in the same context to the various procedures relating to the signalling frames.

Now that the processing of the signalling frames has been explained, the frequency control and synchronization processes will be described.

In addition to the traffic frames TF, monitoring frames MF and signalling frames SF, the 26 multiframe comprises an "idle" or rest frame RF which in the GSM system is the 26th frame. During this idle frame no information is exchanged between the terminal and the base station to which it is connected.

Note also that if the third operation OP3 (power measurement) is not effected during the 25th frame the terminal can receive another channel from time 5.5 T if the time origin is at the start of this frame. The period between 5.5 T and 16 T is therefore available for carrying out the processes in question which will be initialized before the start of this period.

The terminal selects the 51 multiframe sent by an adjacent base station, advantageously that which it receives best, in order to prepare for possible transfer of the call from the base station to which it is connected to this adjacent base station.

The channels sent by the adjacent base station include the frequency control channel FCCH and the synchronization channel SCH.

The frequency control process detects on the FCCH a particular burst formed by a series of bits at 0. Given the modulation employed, this represents a pure sinusoid to which the terminal will be able to synchronize.

Given the 51 multiframe structure as described in GSM recommendation 05.02, for example, it is necessary to open a receive window of duration 9 T to scan the multiframe, this window repeating every 26 frames, in order to be certain of identifying the sinusoid sent on the FCCH. The observation window R'2 mentioned previously in relation to the 25th and 26th frames is therefore used.

The sequencing of this process, which represents the fifth mode phase (PM=5) therefore comprises the following operations:

— initialization operation OP1: the control circuit sets the signal processing circuit in this mode phase, supplying to it the necessary information.

— operation OP2: preliminary receive processing of the burst received in the observation window R'2.

— operation OP4: processing of this burst to determine if it represents a frequency control channel FCCH by estimating the receive frequency and comparing it with a particular threshold to determine whether or not the FCCH is detected.

— operation OP9: temporary storage of received speech samples.

— operation OP10: temporary storage of groups of speech samples.

— terminal operation OP15: sending of a message to the control circuit indicating among other things if the FCCH is detected and, if so, the value of the received frequency.

The control circuit repeats this phase mode for a particular channel until the FCCH is detected and until the 51 multiframe has been scanned completely. If this multiframe has been scanned unsuccessfully, then the control circuit applies the same procedure to a different channel.

Activation of this mode phase therefore fails to respect the periodicity of the 26 multiframe. It is variable by its very nature.

Once the FCCH is detected, the control circuit can trigger the synchronization process. This applies to a particular time slot of a frame of the 51 multiframe which conveys the synchronization burst to be processed.

Given the synchronization offset between the 51 multiframe and the 26 multiframe as seen by the terminal, this time slot assumes a position determined by the frequency control process in a detection message during a period starting at 5.5 T and ending at 14.5 T.

This is why the observation window R'2 already mentioned is used here also.

The sequencing of this process (which represents the sixth mode phase) therefore comprises the following operations:

— preliminary operation OP1: the control circuit sets the signal processing circuit in this mode phase, telling it the temporal position of the synchronization packet.

— operation OP2: preprocessing of the burst received in the observation window R'.

— operation OP5: processing of the synchronization channel SCH to decode the received burst formed by a learning sequence of 64 bits and a synchronization information sequence of 78 bits (GSM recommendation 05.02).

— operation OP9: temporary storage of received speech samples.

— operation OP10: temporary storage of groups of speech samples.

— final operation OP15: sending of a message to the control circuit including this synchronization information.

The frequency control process and the synchronization process as described are triggered during a frame. This must not be seen as limiting on the invention. It is possible to arrange the mode phases in other ways and for example to group all operations carried out during the 25th frame and the idle frame following it provided that the third operation OP3 is not carried out during the 25th frame. If the process associated with the idle frame is a frequency control process, the initialization process and the terminal operation are eliminated, their contents being incorporated into the configuration process defined in the preceding mode phase. If the process associated with the idle frame is a synchronization process, the preliminary and final operations will be integrated into the same configuration process.

The man skilled in the art will know how to generalize the arrangement proposed hereinabove to the case in which the frame preceding the idle frame is a traffic frame. He will experience no difficulty in applying a similar method if the frame preceding the idle frame is a signalling frame, the four operations described above being incorporated not into the configuration process of the preceding phase but into the configuration process of this frame.

The sequencing as described enables all signal processing to be effected using mode phases which are all activated synchronously with the same period, in the example adopted, the operations OP9 and OP10 are carried out in real time, independently of the frame timing.

The embodiments that have been described must not be regarded as limiting on the present invention as to the number of terminals sharing the same communication channel. There may be more than two.

The distribution of the traffic frames in a group of frames in the context of the invention is not limiting either. For example, frames 1, 3, 5, 7, 9, 11, 14, 16, 18, 20, 22 and 24 may be assigned to the terminal as traffic frames.

What is claimed is:

1. Method of sequencing signal processing in a digital cellular radio system having a reduced rate communication mode for conveying digitized speech over a communication channel between at least two terminals and a base station, said radio system using multiframes each comprising a sequence of frames, some of said frames being used for conveying digitized speech and being designated as traffic frames, said digitized speech comprising coded blocks each representing a single group of speech samples, each coded block being formed of 2·s sub-blocks, a pth sub-block of a coded block and a (p+s)th sub-block of a preceding coded block being combined in a pth packet conveyed during a pth traffic frame, each said multiframe comprising k groups of 2×s consecutive frames, each of said k groups of 2×s consecutive frames including only s traffic frames, any traffic frame being identified within its respective said multiframe by the expression s·j+p, each of said traffic frames comprising at least two disjoint time slots including a first time slot for a send packet and a second time slot for a receive packet, said method comprising the following steps during each group j of said k groups of 2×s consecutive frames:

during each traffic frame s·j+p, processing a pth receive packet in a respective receive time slot by recovering the pth receive sub-block of a (j+n)th coded receive block and the (p+s)th receive sub-block of a (j+n−1)th coded receive block, and processing a pth send packet in a respective send time slot by combining a pth send sub-block of a (j+n)th coded send block and a (p+s)th send sub-block of a (j+n−1)th coded send block;

during a send period, forming a next (j+n+1)th coded send block from a group of speech samples to be sent; and during a receive period, recovering a prior (j+n−2)th coded receive block and recovering any corresponding speech samples contained therein, where s is a positive integer representative of the number of sub-blocks in a coded block divided by 2, k is a positive integer representative of the number of coded blocks in a multiframe, j is a first integer variable 0≦j<k representative of the position of a coded block within a multiframe, n is a second integer variable representative of the rank of the coded send block whose first sub-block is sent on the first frame of said current multiframe, and p is a third integer variable 0<p≦s representative of the position of a sub-block within a coded block.

2. Method according to claim 1 wherein, for the same value of j, said send period and said receive period are separate.

3. Method according to claim 1 wherein the send periods of each of said groups of frames occupy the same position in said groups.

4. Method according to claim 1 wherein the receive periods of each of said groups of frames occupy the same position in said groups.

5. Method according to claim 1 wherein
each said base station broadcasts signals on a respective one of a plurality of control channels and
during at least one of said traffic frames supplementary processing is carried out to measure the power of the signal received on one of the control channels.

6. Method according to claim 3 wherein said send period is in a group of frames outside the traffic frames of said group.

7. Method according to claim 4 wherein each said receive period coincides with a respective one of said s·k traffic frames.

8. Method according to claim 7 wherein said respective traffic frame is that conveying the last sub-block of the (j+n−1)th coded block.

9. Method according to claim 1 wherein further comprising the steps for each said traffic frame:
specifying at the beginning of said each traffic frame other processes to be carried out during said traffic frame, and
indicating the completion of said other processes during said each traffic frame.

10. Method according to claim 1 wherein said steps are carried out sequentially.

11. Method according to claim 1 wherein said digitized speech communications are made up of a plurality of bursts, and said step of processing the pth send packet comprises the further steps:
enciphering the send packet,
forming a burst from said packet, and
modulating said burst.

12. Method according to claim 11 wherein said processing of the pth receive packet comprises the further steps:
preliminary processing of a receive burst,
demodulating said burst to define said pth receive packet, and deciphering the demodulated burst by a process which is the converse of the process used to encipher the send packet.

13. Method according to claim 1 wherein forming of a coded send block comprises the further steps:
speech coding of said group of speech samples to form a send speech block, and
channel coding of said send speech block to define said coded send block.

14. Method according to claim 13 wherein said recovering of a receive coded block comprises the further steps:

channel decoding of said receive coded block by a process which is the converse of said channel coding, to thereby form a received speech block, and
speech decoding of said received speech block by a process which is the converse of said speech coding.

15. Method according to claim 11 wherein said further steps are carried out sequentially.

16. Method according to claim 1 wherein at least one frame of each of said multiframes is a signalling frame used to send signalling by means of coded signalling blocks between said terminal and said base station, each coded signalling block is conveyed by t respective signalling packets during each of t successive signalling frames, each coded signalling block is formed of 2·t sub-blocks groups in pairs in said packets, any signalling frame is identified by the expression MT=t·(i·−1)+q, said method comprising the further steps:
during each signalling frame:
a configuration step for determining the value of q,
a receive step for recovering the two sub-blocks of the qth packet of the ith received coded signalling block,
a send step for grouping the two sub-blocks of the qth packet of the ith send coded signalling block;
during a particular decoded signalling frame, for each value of i, after reception of the last packet of an ith receive coded signalling block:
a decoding step for recovering respective receive signalling information from the ith receive coded signalling block; and
during a particular coding signalling frame, for each value of i, before sending of the first packet of an ith send coded signalling block:
a coding step for coding respective send signalling information for the ith send coded signalling block,
where
t is a positive integer representative of the number of sub-blocks in a coded signalling block divided by 2,
q is a fifth integer variable 0<q<t representative of the position of a signalling packet within a coded signalling block, and
i is a positive fourth integer variable representing the rank of a coded signalling block.

17. Method according to claim 16 wherein, for a same value of i, the decoding frame and the coding frame are two separate frames for which there are two separate values of q.

18. Method according to claim 16 wherein the decoding frames for different values of i are identified by the same value of q.

19. Method according to claim 16 wherein the coding frames for different values of i are identified by the same value of q.

20. Method according to claim 18 wherein the decoding of the ith receive coded signalling block takes place during the (t·i)th signalling frame.

21. Method according to claim 19 wherein the coding of the ith coded signalling block takes place during the {t(i−1)+1}th signalling frame.

22. Method according to claim 16 wherein
each said base station broadcasts signals on a respective one of a plurality of control channels and
during at least one of said signalling frames supplementary processing is carried out to measure the power of the signal received on one of the control channels.

23. Method according to claim 16 wherein said steps are carried out sequentially.

24. Method according to claim 1 wherein each of said multiframes further comprises an idle frame, an observation window for receiving a frequency control channel supports a signal of predetermined frequency and takes place between the completion of the steps carried out during the frame preceding said idle frame and the end of said idle frame, an analysis stage extends from the start of said observation window to the end of said idle frame and during at least one said analysis stage there is effected a frequency control process comprising the following steps:
  a frequency control step for establishing if said predetermined frequency has been detected during said observation window, and
  a post frequency control step indicating an end of said frequency control process and a result of the preceding frequency control step, comprising, if said predetermined frequency was detected, a detection message.

25. Method according to claim 24 wherein when said predetermined frequency has been detected, a synchronization channel associated with said frequency control channel supports a synchronization packet situated in one of said observation windows at the location indicated in said detection message, said synchronization packet comprises a synchronization message that has been coded, and during the analysis stage corresponding to said observation window there is effected a synchronization process comprising the following steps:
  a preliminary step specifying in particular a temporal position of said synchronization packet,
  a synchronizing step for recovering said synchronization message from said synchronization packet, and
  a post synchronization step for indicating an end of said synchronization process and supplying said synchronization message.

26. Method according to claim 24 wherein
  said frequency control process associated with an idle frame is grouped with the steps carried out during the frame preceding said idle frame,
  the steps of said frequency control process are spread across the two frames concerned and
  an initialization step and said post frequency control step are incorporated into a configuration step.

27. Method according to claim 25 wherein
  said synchronization process associated with an idle frame is grouped with the steps carried out during the frame preceding said idle frame,
  the steps of said synchronization process are across the two frames concerned and
  said preliminary step and said post frequency control step are incorporated into a configuration step.

28. Method according to claim 1, wherein said digital cellular radio system is a GSM system in which $s=2$ and $k=6$.

* * * * *